United States Patent
Burg

(10) Patent No.: US 9,783,209 B2
(45) Date of Patent: Oct. 10, 2017

(54) OVERHEAD LIGHT IN ARTICULATION AREA OF RAIL VEHICLES

(71) Applicant: SIEMENS INDUSTRY, INC., Alpharetta, GA (US)

(72) Inventor: Wilhelm Burg, Bamberg (DE)

(73) Assignee: SIEMENS INDUSTRY, INC., Alpharetta, GA (US)

( * ) Notice: Subject to any disclaimer, the term of this patent is extended or adjusted under 35 U.S.C. 154(b) by 355 days.

(21) Appl. No.: 14/471,457

(22) Filed: Aug. 28, 2014

(65) Prior Publication Data

US 2015/0251669 A1    Sep. 10, 2015

Related U.S. Application Data

(60) Provisional application No. 61/948,949, filed on Mar. 6, 2014.

(51) Int. Cl.
 *B61D 17/00* (2006.01)
 *B61D 17/22* (2006.01)
 *B60D 5/00* (2006.01)

(52) U.S. Cl.
 CPC ............ *B61D 17/22* (2013.01); *B60D 5/003* (2013.01)

(58) Field of Classification Search
 CPC .......... B60D 5/003; B60D 5/00; B60D 5/006; B61D 3/10; B61D 3/12; B61D 3/14; B61D 17/22; B61D 17/20; B61D 29/00
 See application file for complete search history.

(56) References Cited

U.S. PATENT DOCUMENTS

| | | | | |
|---|---|---|---|---|
| 2,526,828 A | * | 10/1950 | Phillips | B60H 1/262 138/103 |
| 4,736,688 A | * | 4/1988 | Ando | B61D 17/22 105/17 |
| 5,136,486 A | * | 8/1992 | Burkarth | B60H 1/00371 362/149 |
| 9,440,661 B2 | * | 9/2016 | Burg | B61D 17/00 |
| 2015/0078019 A1 | * | 3/2015 | Lohmann | B61D 29/00 362/478 |

(Continued)

FOREIGN PATENT DOCUMENTS

| | | |
|---|---|---|
| DE | 3036105 A1 | 4/1982 |
| DE | 10204703 A1 | 8/2003 |

(Continued)

OTHER PUBLICATIONS

PCT International Search Report mailed May 20, 2015 corresponding to PCT International Application No. PCT/US2015/019139 filed Mar. 6, 2015 (5 pages).

*Primary Examiner* — Jason C Smith

(57) ABSTRACT

A bellows assembly for an articulated vehicle connects a first vehicle module and a second vehicle module. The bellows assembly forms a tube between the first vehicle module and the second vehicle module with a top region and a bottom region, the top region corresponding to a roof region of the vehicle above an aisle of the vehicle. The bellows assembly includes a section configured to receive a lighting installation, the section being arranged in the top region of the bellows assembly. Further, an articulated vehicle with such a bellows assembly and a system for installing such a bellows assembly is described.

18 Claims, 2 Drawing Sheets

(56) References Cited

U.S. PATENT DOCUMENTS

| | | | |
|---|---|---|---|
| 2015/0251668 A1* | 9/2015 | Burg | B61D 17/12 |
| | | | 52/17 |
| 2015/0251669 A1* | 9/2015 | Burg | B61D 29/00 |
| | | | 105/18 |
| 2016/0144872 A1* | 5/2016 | Meergans | B61D 1/00 |
| | | | 52/220.6 |

FOREIGN PATENT DOCUMENTS

| | | |
|---|---|---|
| DE | 202010013536 U1 | 12/2010 |
| EP | 2159084 A1 | 3/2010 |
| WO | 2013087206 A1 | 6/2013 |

* cited by examiner

OVERHEAD LIGHT IN ARTICULATION AREA OF RAIL VEHICLES

CROSS REFERENCE TO RELATED APPLICATION

This application claims benefit, under 35 U.S.C. §119(e), of U.S. Provisional Application No. 61/948,949, filed Mar. 6, 2014, the entire contents and substance of which is hereby incorporated by reference.

BACKGROUND

1. Field

Aspects of the present invention relate to an overhead light in an articulation area of a vehicle, for example a rail vehicle.

2. Description of the Related Art

Articulations are used to connect all kinds of rail vehicle modules, i.e. streetcar modules, Light Rail Vehicle (LRV) modules, coaches, etc. Modern rail vehicles use bellows all around, i.e. ceiling sides and bottom. The bottom is covered by some kind of plate order to be able to walk through. The bellows are nowadays usually made out of a kind of rubber or fabric reinforced rubber material and creates a tunnel type area without any natural light. Thus, the area is somehow less preferred by passengers. Until now, designers try to place windows as close as possible to the articulation. However, this approach is limited because car shell structure is needed close to the articulation to be able to handle all applicable loads. Additionally artificial light is positioned to at least fulfill the specified minimum illumination on floor level.

An improved overhead light in an articulation area of a vehicle is desired.

SUMMARY

Briefly described, aspects of the present invention relate to an overhead light in an articulation area of a vehicle, in particular a rail vehicle. Such vehicles can be for example railcars like streetcars, light rail vehicles, automatic (airport) shuttles, metros, commuter trains, EMUs (Electric Multiple Units), DMUs (Diesel Multiple Unit), coaches, and high speed trains. Furthermore, such vehicles can also be for example coaches or busses or many other vehicles for passenger transportation.

Aspects of the present invention include implementing overhead light integrated in an articulation area of a vehicle in order to enhance this passenger area tremendously. Overhead light, especially natural overhead light creates a feel of comfort.

A first aspect of the invention provides a bellows assembly for an articulated vehicle, the bellows assembly connecting a first vehicle module and a second vehicle module. The bellows assembly forms a tube between the first vehicle module and the second vehicle module with a top region and a bottom region, the top region corresponding to a roof region of the vehicle above an aisle of the vehicle. The bellows assembly comprises a section configured to receive a lighting installation, the section being arranged in the top region of the bellows assembly.

A second aspect of the invention provides an articulated vehicle comprising a bellows assembly connecting a first vehicle module and a second vehicle module. The bellows assembly forms a tube between the first vehicle module and the second vehicle module with a top region and a bottom region, the top region corresponding to a roof region of the vehicle above an aisle of the vehicle, and a section configured to receive a lighting installation, the section being arranged in the top region of the bellows assembly.

A third aspect of the invention provides a system for installing a bellows assembly between two vehicle modules of a vehicle. The system comprises fastening elements provided in at least two vehicle modules for fastening a bellows assembly between the at least two vehicle modules, the bellows assembly comprising a bellows and a lighting installation, wherein the lighting installation is incorporated into a top region of the bellows.

DETAILED DESCRIPTION

The components and materials described hereinafter as making up the various embodiments are intended to be illustrative and not restrictive. Many suitable components and materials that would perform the same or a similar function as the materials described herein are intended to be embraced within the scope of embodiments of the present invention.

Figure 1A:
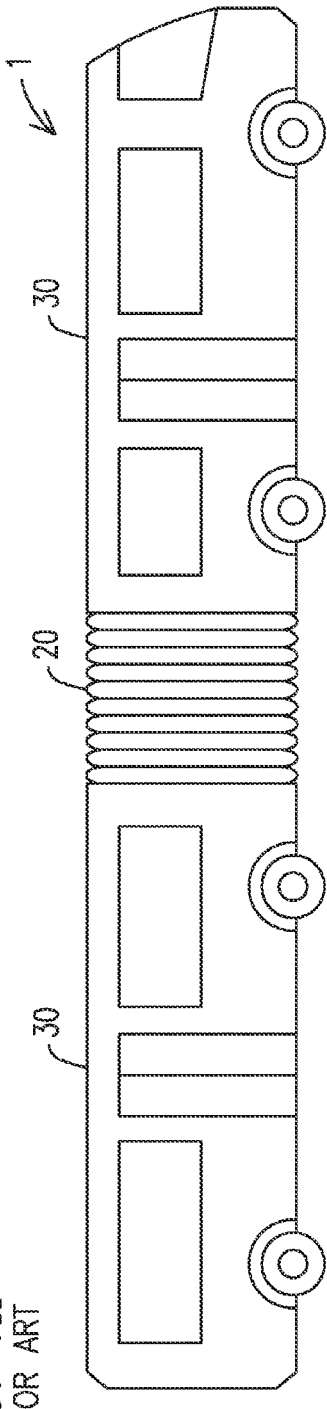
FIG. 1A shows a schematic representation of a side view of an articulated vehicle in accordance with the prior art.

FIG. 1A shows a schematic representation of a side view of an articulated vehicle 1 in accordance with the prior art. The articulated vehicle 1 comprises two vehicle modules, designated as car shells 30, which are connected by a bellows 20. The bellows 20, also called gangway bellows, is arranged between mutually opposed faces of two consecutive vehicle sections, for example the car shells 30, of a sectional vehicle, for example an articulated bus, and are attached at their ends to these faces. The bellows 20 forms a tube, which is dosed around its entire periphery and is open at the both ends, and surrounds a crossover platform.

Figure 1B:
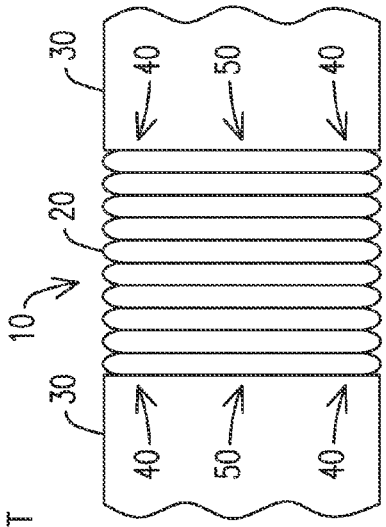
FIG. 1B shows a schematic representation of a top view of an articulation area of vehicle in accordance with the prior art.

FIG. 1B shows a schematic representation of a top view of an articulation area 10 of a vehicle, for example a rail vehicle. The articulation area 10 comprises a bellows 20 arranged between two vehicle modules, i. e. car shells 30. The two car shells 30 are connected via the bellows 20. The bellows 20 comprises flexible material, for example rubber material or fabric reinforced rubber material. A tunnel type area without any natural light is created.

Within the articulation area 10 on ground level, there are usually running plates arranged, either formed as a turning table or as sliding plate(s). Underneath the plates is a coupler or a type of strong coupler connection to connect the two vehicle modules. The bellows is normally fully closed underneath of the coupler, i.e. the bellows itself from a tube. But some other types of vehicles, like certain articulated busses, airport shuttles, or streetcars do not have a bellows underneath the coupler. In this case, the bellows including the running plates form a tube.

A full length of the flexible material of the bellows 20 is only needed on the side areas 40 to allow for example a consist run through a horizontal curve. The side areas 40 as indicated in FIG. 1B define a large movement area. In the center area 50 of the bellows 20, in particular of the roof area, above the aisle, the flexible material of the bellows is only needed for example to allow a consist run through vertical curves, i.e. crest and sag. Vertical curves have much larger radii than horizontal curves. Thus, the full length of flexible material of the bellows 20 is not needed in the center area 50 of the roof area. The center area 50 defines a small movement area compared to the large movement areas of the side areas 40 of the bellows.

Figure 2:
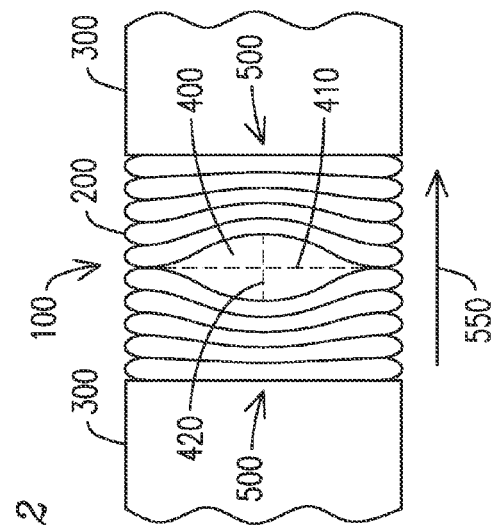
FIG. 2 shows a schematic representation of a top view of an articulation area with a section for an integrated overhead light of a vehicle, for example a rail vehicle, in accordance with an exemplary embodiment of the present invention.

FIG. 2 shows a schematic representation of a top view of an articulation area 100 with a section 400 for an integrated overhead light of a vehicle, for example a rail vehicle, in accordance with an exemplary embodiment. The articulation area 100 comprises a bellows 200 with an added fixed section 400. The fixed section 400 is arranged essentially in the center area 500 of the bellows 200. As described before, the full length of the flexible material of the bellows 200 in the center area 500 of the roof area, above the aisle of the vehicle, is usually not fully needed and may therefore be used for overhead lights.

The fixed, non-flexible, section 400 can include for example a window which allows natural light to enter the articulation area 100. The window can comprise glass, acrylic glass or many other materials allowing natural light to enter the section 400. To improve the amount of light, a prism may be used. In a further embodiment, the non-flexible section 400 in the bellow ceiling can also be used for artificial lights or a combination of window or prism and artificial light.

The fixed section 400 can comprise the shape of a rhombus, also called diamond. As shown in this example, the rhombus has two diagonals 410 and 420 connecting pairs of opposite vertices. The two diagonals 410 and 420 are perpendicular, wherein the rhombus is shaped such that the diagonal 420, which is parallel to a longitudinal direction 550 of the articulated vehicle, comprises a length which is shorter than the length of the diagonal 410. This means that the rhombus (diamond) is arranged such that its longer diagonal 410 extends perpendicular to the longitudinal direction 550 of the vehicle.

The fixed section 400 can comprise many other shapes for example a parallelogram, rectangle, oval or ellipse. For the section 400, shapes are selected which comprise a longitudinal direction which is greater than a lateral direction of the shape, wherein the longitudinal direction of the section 400 is perpendicular to the longitudinal direction 550 of the vehicle. In this way, the center area 500 of the bellows 200 is used in an optimal way, i.e. most of the center area 50, but least of the side areas 40 (see FIG. 1B) is used for the fixed section 400.

The section 400 can comprise a cut-out or opening in the bellows 200. The integrated overhead lights, for example a window, can be arranged in the cut-out or opening and fastened to the bellows 200. For example, a frame, having the form of the opening, can be arranged in the opening and a window can be arranged in the frame. Many other types of fastening the overhead lights within the cut-out or opening to the bellows can be used, for example adhesives technologies or many other fastening methods and structures known to persons of ordinary skill in the art.

The section 400 can have sloped and easy-to-clean or self-cleaning upper surfaces, for example with a so called lotus-effect, to prevent an accumulation of duct or dirt which would hinder natural light to enter the vehicle.

The non-flexible section 400 in the bellows 200 can also be used for artificial lights. In case of artificial lights, the section 400 may not comprise a cut-out or opening, but a designated ceiling area configured to arrange lighting installations (see FIG. 4 and FIG. 5).

Figure 3:
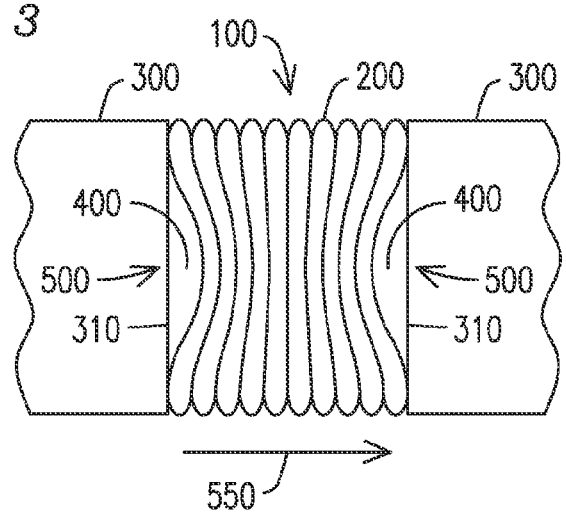
FIG. 3 shows a schematic representation of a top view of an articulation area with two sections for integrated overhead lights of a vehicle, for example a rail vehicle, in accordance with an exemplary embodiment of the present invention.

FIG. 3 shows a schematic representation of top view of an articulation area 100 with two sections 400 for integrated overhead lights of a vehicle, for example a rail vehicle. FIG. 3 shows an option with two split sections 400 to implement overhead or sky lights in the articulation area 100. The bellows 200 can comprise a plurality of sections 400 in a plurality of shapes.

The sections 400 can each comprise the shape of a triangle, in particular an isosceles triangle. Furthermore, the triangle can be an obtuse triangle which has one angle greater than 90°. The angle greater than 90° as shown in FIG. 3 lies opposite a face 310 of the car shell 300. The embodiment according to FIG. 3 provides that an overhead light in the form of the triangle can be mounted directly to the car shell 300. The lighting installations are mounted within the roof region of the vehicle 100 to the car shells 300. The bellows 200 is connected to opposite faces of the car shells 300, wherein the lighting installations can be mounted to the faces of the car shells.

The fixed sections 400 can comprise many other shapes, wherein shapes are selected which comprise a longitudinal direction which is greater than a lateral direction of the shape, wherein the longitudinal direction of the section 400 is perpendicular to the longitudinal direction 550 of the vehicle. In this way, the center area 500 of the bellows 200 is used in an optimal way, i.e. most of the center area 500, but least of the side areas 40 (see FIG. 1B) is used for the fixed section 400.

Figure 4:
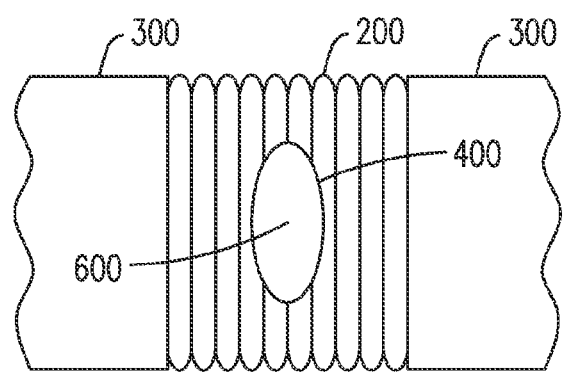
FIG. 4 shows a schematic representation of a view inside a vehicle, for example a rail vehicle, from the bottom up to the ceiling within an articulation area with a section for an overhead light, in accordance with an exemplary embodiment of the present invention.

FIG. 4 shows a schematic representation of a view inside a vehicle, for example a rail vehicle, from the bottom up to the ceiling within an articulation area with a section for an overhead light, in accordance with an exemplary embodiment of the present invention.

As mentioned before, the non-flexible section 400 in the bellows 200 can also be used for artificial lights. In case of artificial lights, the section 400 may not comprise a cut-out or opening, but a designated ceiling area configured to arrange lighting installations. FIG. 4 shows that the artificial light installation can use the same area 400 as shown for example in FIG. 2. The artificial light installation 600 is in oval form, but can comprise many other shapes and forms as described before. The light installation 600 can be mounted in the interior of the bellows 200 mounted to the bellows 200 within a ceiling region of the bellows 200.

Figure 5:
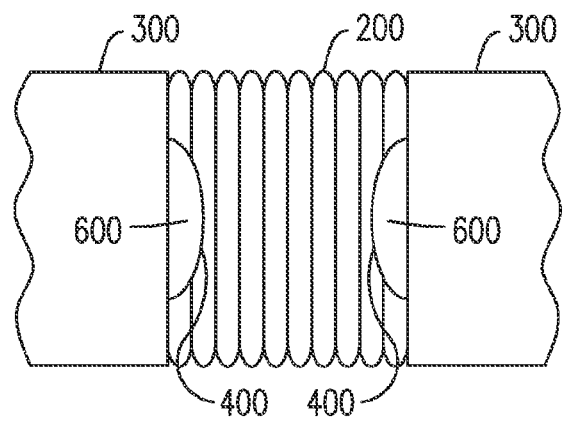
FIG. 5 shows a schematic representation of a view inside a vehicle, for example a rail vehicle, from the bottom up to the ceiling within an articulation area with two sections for overhead lights, in accordance with an exemplary embodiment of the present invention.

FIG. 5 shows a schematic representation of a view inside a vehicle, for example a rail vehicle, from the bottom up to the ceiling within an articulation area with two sections for overhead lights, in accordance with an exemplary embodiment of the present invention. FIG. 5 shows, similar to the arrangement of FIG. 4, that the bellows 200 does not comprise a cut-out or opening, but two artificial lighting installations 600 which are mounted to the end of one or both vehicle modules 300. But the bellows 200 can comprise a plurality of artificial lighting installations 600 mounted to the bellows 200 from inside within a ceiling area of the bellows 200. The lighting installations 600 can comprise many other shapes suitable for the bellows 200 which can be mounted to the car modules 300, in particular to opposite ends of the car modules 300 as shown in FIG. 5.

While embodiments of the present invention have been disclosed in exemplary forms, it will be apparent to those skilled in the art that many modifications, additions, and deletions can be made therein without departing from the spirit and scope of the invention and its equivalents, as set forth in the following claims.

What is claimed is:

1. A bellows assembly for a vehicle comprising an articulation area, the bellows assembly connecting a first vehicle module and a second vehicle module, the bellows assembly forming a tube between the first vehicle module and the second vehicle module with a top region and a bottom region, the top region corresponding to a roof region of the vehicle above an aisle of the vehicle, the bellows assembly comprising:
 a bellows with a section configured to receive a lighting installation, the section being arranged in the top region of the bellows assembly, wherein the section comprises an opening, wherein a window is arranged in the opening and fastened to the bellows, the window allowing natural light to enter the articulation area.

2. The bellows assembly of claim 1, wherein the section comprises a cut-out, wherein the lighting installation is arranged in the cut-out.

3. The bellows assembly of claim 2, wherein a shape of the opening or cut-out corresponds to a shape of the section.

4. The bellows assembly of claim 1, wherein the section is configured as a geometrical shape with a longitudinal extension and a lateral extension, the longitudinal extension having a greater length than the lateral extension, wherein the longitudinal extension of the section is perpendicular to a longitudinal direction of the vehicle.

5. The bellows assembly of claim 1, comprising a plurality of sections configured to receive lighting installations.

6. The bellows assembly of claim 1, wherein the lighting installations are mounted to the first and/or second vehicle module.

7. The bellows assembly of claim 1, wherein the section is arranged in a center area within the top region of the bellows.

8. An articulated vehicle comprising:
 an articulation area comprising a bellows assembly connecting a first vehicle module and a second vehicle module, the bellows assembly forming a tube between the first vehicle module and the second vehicle module with a top region and a bottom region, the top region corresponding to a roof region of the vehicle above an aisle of the vehicle, and
 a section configured to receive a lighting installation, the section being arranged in the top region of the bellows assembly, wherein the section comprises an opening, wherein a window is arranged in the opening and fastened to the bellows, the window allowing natural light to enter the articulation area.

9. The articulated vehicle of claim 8, wherein the section comprises a cut-out, wherein the lighting installation is arranged in the cut-out.

10. The articulated vehicle of claim 8, the bellows assembly comprising a plurality of sections configured to receive lighting installations.

11. The articulated vehicle of claim 8, wherein the articulated vehicle comprises a plurality of bellows assemblies, at least one of the plurality of bellows assemblies comprising a lighting installation in the top region of the bellows.

12. The articulated vehicle of claim 8, wherein the lighting installations are mounted to the first and/or second vehicle module.

13. A system for installing a bellows assembly in an articulation area between two vehicle modules of a vehicle, the system comprising:
 fastening elements provided in at least two vehicle modules for fastening a bellows assembly between the at least two vehicle modules, the bellows assembly comprising a bellows and a lighting installation, wherein the lighting installation is incorporated into a top region of the bellows, and wherein the bellows comprises a section configured to receive the lighting installation, the section comprising an opening, wherein a window is arranged in the opening and fastened to the bellows, the window allowing natural light to enter the articulation area of the vehicle.

14. The system of claim 13, wherein the top region of the bellows assembly corresponds to a roof region of the vehicle.

15. The system of claim 13, wherein the lighting installation is arranged essentially in a center area of the top region of the bellows assembly.

16. The system of claim 13, wherein the lighting installation comprises a longitudinal extensions and a lateral extension, the longitudinal extension having a greater length than the lateral extension, the longitudinal extension of the lighting installation being perpendicular to a longitudinal direction of the vehicle.

17. The system of claim 13, wherein the lighting installation is mounted to one of the at least two vehicle modules.

18. The system of claim 13, wherein the bellows assembly comprises a plurality of lighting installations.

* * * * *